L. HILDRETH.
ANIMAL TRAP.
APPLICATION FILED OCT. 17, 1912.
1,061,477.
Patented May 13, 1913.
2 SHEETS—SHEET 1.
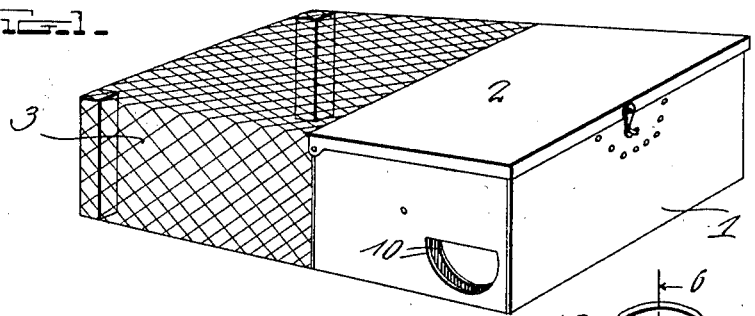
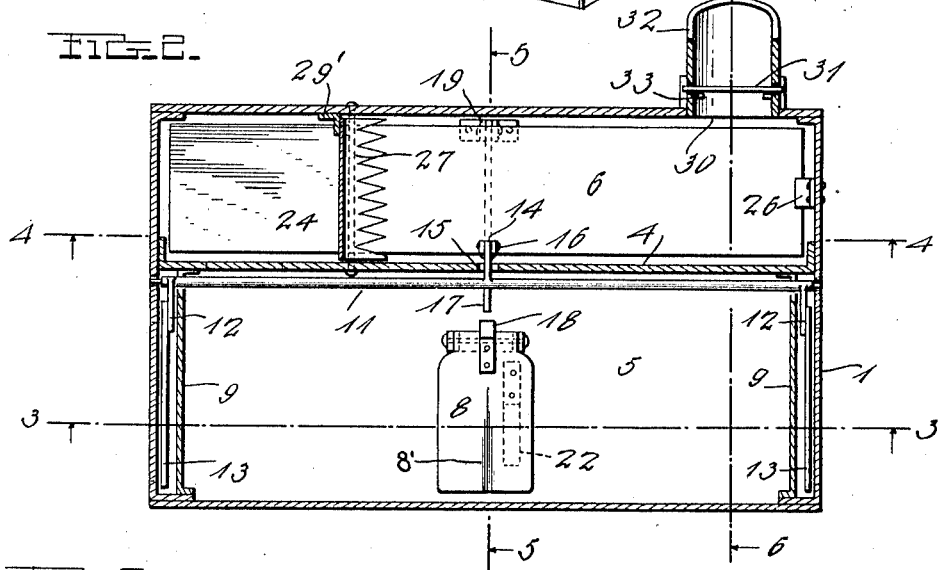
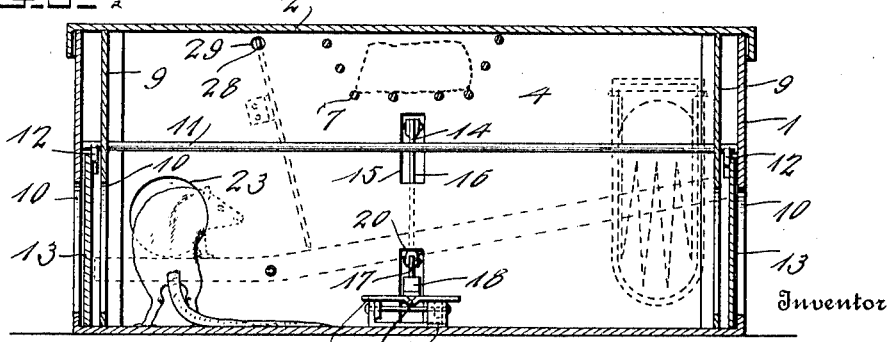
Witnesses
J. R. Pierce
C. E. Hunt
Inventor
Lawrence Hildreth
By H. B. Willson & Co.
Attorneys

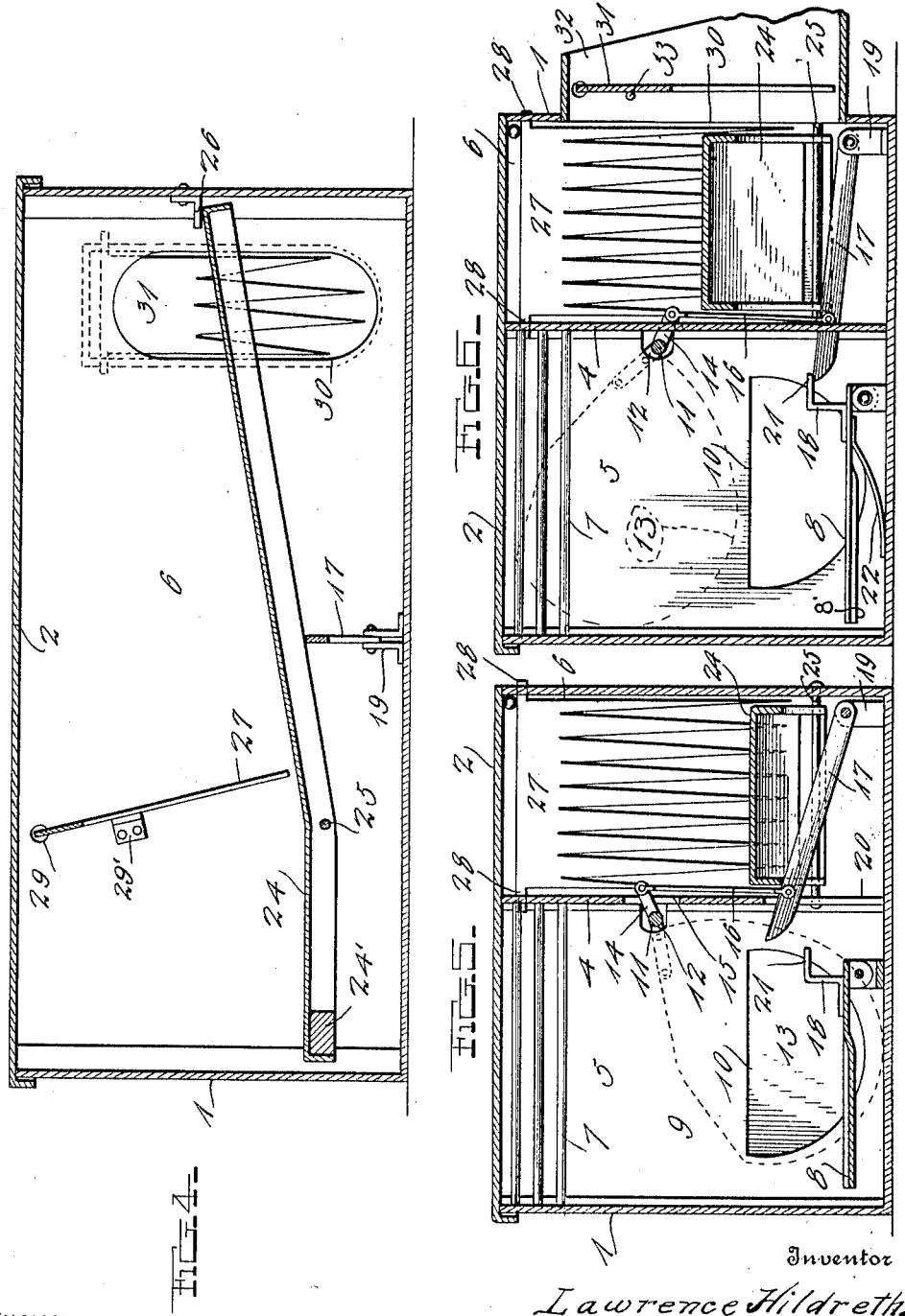

UNITED STATES PATENT OFFICE.

LAWRENCE HILDRETH, OF LEXINGTON, KENTUCKY.

ANIMAL-TRAP.

1,061,477.  Specification of Letters Patent.  Patented May 13, 1913.

Application filed October 17, 1912. Serial No. 726,385.

*To all whom it may concern:*

Be it known that I, LAWRENCE HILDRETH, a citizen of the United States, residing at Lexington, in the county of Fayette and State of Kentucky, have invented certain new and useful Improvements in Animal-Traps; and I do declare the following to be a full, clear, and exact description of the invention, such as will enable others skilled in the art to which it appertains to make and use the same.

This invention relates to improvements in animal traps.

One object of the invention is to provide an animal trap having means whereby the same will be reset by the animal caught therein when the animal passes through the trap and into the receiving cage thereof thereby permitting the trap to be used continuously until the cage is filled.

Another object is to provide a trap of this character which will be simple, strong, durable and inexpensive in construction, efficient and reliable in operation, and well adapted to the purpose for which it is designed.

With these and other objects in view, the invention consists of certain novel features of construction, and the combination and arrangement of parts as will be more fully described and claimed.

In the accompanying drawings; Figure 1 is a perspective view of my improved animal trap; Fig. 2 is a horizontal section thereof; Fig. 3 is a vertical longitudinal section taken on the line 3—3 of Fig. 2; Fig. 4 is a similar view taken on the line 4—4 of Fig. 2; Fig. 5 is a vertical cross section taken on the line 5—5 of Fig. 2; Fig. 6 is a similar view taken on the line 6—6 of Fig. 2.

My improved trap comprises a main body portion 1 which may be of any suitable size and shape and constructed of any suitable material. In the present embodiment of the invention the body 1 is shown as being of rectangular oblong shape and constructed of sheet metal. The body 1 of the trap is provided with a hinged top 2 which may be fastened in a closed position in any suitable manner. Connected with one side of the body of the trap is a receiving cage 3 into which the animals may pass from the body of the trap but from which they cannot return to said body.

The body 1 is divided longitudinally by a vertical partition 4 into a bait compartment 5 and a passageway or runway 6. In the upper portion of the center of the compartment 5 is arranged a bait holding rack 7 beneath which and hingedly supported above the bottom of the trap is a treadle 8, preferably ribbed as at 8' to give it stiffness, and the purpose of this treadle will be hereinafter described. In the ends of the compartment 5 are arranged partitions 9 which are spaced a slight distance from the inner sides of the adjacent portions of the ends of the body and in said partitions and the adjacent ends of the body are formed alined inlet openings 10 through which the animals enter the trap. Arranged along the partition 4 in the compartment 5 and having its ends journaled in the ends of the compartment is a rock shaft 11 having fixed thereto adjacent to the ends of the body 1 door supporting and operating arms 12 to which are secured doors 13 which are adapted to work in the spaces between the partitions 9 and the adjacent ends of the body of the trap and which when the rock shaft 11 is released will drop over the openings 10 thus imprisoning the animal which has entered and sprung the trap. Fixed to the center of the rock shaft 11 is a short crank arm 14 which projects through a slot 15 in the partition 4 and into the passage or runway 6. The end of the crank arm is connected by a link 16 to one member 17 of a catch, the opposite member 18 of which is secured to the treadle 8 by means of which the catch is released in a manner hereinafter described.

The catch member 17 comprises a bar which extends across the passage 6 near the bottom thereof and has one end pivotally connected to a bracket 19 secured to the bottom of the trap. The free end of the bar or catch member 17 projects through a slot 20 in the partition 4 and when the catch member is swung downwardly to an operative position for rocking the shaft and holding the doors 13 open, is adapted to be engaged with the catch member 18 on the treadle 8. The catch member 18 is in the form of a short upwardly projecting plate having on its upper end a short right angular lip 21 with which the end of the catch member 17 is engaged when said member is forced downwardly in the manner described and the treadle swung upwardly to a slight extent. The treadle is preferably provided on its lower side with a light leaf spring 22 which yieldingly holds the treadle up in an operative position to permit the catch member 18 thereon to engage the catch member 17, and which will prevent the weight of the treadle from accidentally causing the disengagement of said catch members. When the catch members 17 and 18 have been engaged to support the doors in an open position as herein described, it will be seen that an animal entering the bait compartment 5 will in an effort to reach the bait on the rack 7 over the treadle, step on and depress the treadle thereby releasing the catch member which will allow the shaft 11 to rock and the doors 13 to drop to closed positions thereby confining the animal in the compartment 5. By providing the partitions 9 between which and the ends of the compartment 5, the doors 13 operate, it will be seen that it will be impossible for the trapped animal to raise the doors and escape.

In order to provide for an automatic resetting of the trap after an animal has been caught an exit opening 23 is provided in the partition 4 near one end of the compartment 5 through which the trapped animal may pass into the passage or runway 6. In the passage or runway 6 is a false bottom 24 in the form of a plate which is arranged above and in engagement with the catch member 17 and is pivotally mounted near one end on a transverse shaft 25 secured at its ends in the partition 4 and adjacent side of the body 1. The shorter end of the false bottom 24 is disposed opposite to the exit opening 23 and is provided with a weight 24' whereby said end is normally held down in position to permit the animal to pass through the opening 23 and onto this end of the bottom 24. Arranged in the opposite end of the passage 6 is a stop lug 26 which limits the upward movement of this end of the bottom.

Arranged across the passage 6 a short distance beyond the opening 23 in the partition 4 is a drop door 27 which is preferably constructed from a sheet metal plate having on the opposite edges of its upper end laterally projecting trunnions 28 which revolubly engage bearing apertures 29 in the side of the body 1 and in the partition 4. The plate is notched or slitted upward from its lower edge to form a series of spaced sharp pointed bars to permit the animal entering the passage 6 through the opening 23 to see the opposite end of the passage. The drop door is supported in a slightly inclined position by a supporting lug 29' secured to the inner side of the body 1 as shown. In the side of the body at the opposite end of the passage 6 and communicating with the cage 3 of the trap is an exit opening 30 which is covered by a drop door 31 constructed in a similar manner to the drop door 27 and which is adapted to swing outwardly or into the cage to permit the animal to pass beneath the same from the passage 6 into the cage. The door 31 operates in a frame or housing 32 which surrounds the opening 30 on the outer side of the trap and prevents any of the animals in the cage from opening the door 31 and passing back into the passage 6. The door 31 is held in an operative position and the inner movement thereof limited by a stop pin 33 arranged in one side of the housing 32 surrounding the opening 30.

By constructing and arranging the false bottom 24 and the drop doors 27 and 31 in the passage 6 as herein shown and described, it will be seen that when the animal caught in the compartment 5 passes through the opening 23 into the passage 6 the weight of the animal on the false bottom 24 after passing beneath the door 27 and into the opposite end of the passage 6, will depress or swing this end of the bottom downwardly thereby depressing the catch member 17 and rocking the shaft 11 which will swing the doors 13 to open positions. In thus depressing the catch member 17 the free end thereof will be sprung into engagement with the lip 21 of the catch member 18 on the treadle 8 thereby fastening the rock shaft in position to hold the doors open until the treadle is again depressed and the catch members released by the next animal entering the trap. The animal after passing through the passage 6 and depressing the bottom 24 in the manner described will pass out through the opening 30 beneath the door 31 and into the cage 3 in which the animal will be confined by the drop door 31 which falls back into place after the animal has passed beneath the same as will be readily understood. As soon as the animal leaves the passage 6 and this end of the bottom is relieved of the animal's weight the weight at the opposite end of the bottom will again swing the same upwardly to an operative position. It will be noted that the free end of the catch member 17 is beveled so that when said member is depressed by the bottom 24 the beveled end of said member will force the catch member 18 and the treadle back against the pressure of the treadle spring until the end of the catch member 17 is brought beneath the lip 21, whereupon the treadle spring will actuate the treadle and catch member 18 thereon to automatically engage the lip 21 with said beveled end of the catch member 17.

Having thus particularly described my invention what I claim is:

The herein described trap comprising a body divided by a longitudinal partition into a bait compartment and a passage way parallel therewith, the body having inlet openings into the ends of said compartment and an outlet opening out of one end of said passageway and said partition having an opening connecting the other end of the passageway with said compartment, a cage with which said outlet opening communicates, a drop door in this opening for checking the return of the animals caught, a drop door in said passageway opening toward the first-named drop door, a weighted false bottom in the passageway pivotally supported under this drop door, a catch member beneath the normally raised end of said false bottom, a rock shaft with which the moving end of said catch member is connected, doors carried by said rock shaft and adapted to close said inlet openings, transverse partitions in the bait compartment between which and the ends of this compartment the doors move, a treadle pivotally mounted on the bottom of this compartment midway between said doors, and a second catch member carried by the treadle and adapted to coöperate with the first, the whole constructed substantially as described.

In testimony whereof I have hereunto set my hand in presence of two subscribing witnesses.

LAWRENCE HILDRETH.

Witnesses:
JOHANNA COLBERT,
JOE. R. BRITTINGHAM.

---

Copies of this patent may be obtained for five cents each, by addressing the "Commissioner of Patents, Washington, D. C."